(12) United States Patent
Terao et al.

(10) Patent No.: US 11,873,703 B2
(45) Date of Patent: Jan. 16, 2024

(54) METHOD OF UNDERGROUND STORAGE OF INJECTION GAS CONTAINING CO2 GAS AND ENHANCED OIL RECOVERY

(71) Applicant: Japan Petroleum Exploration Co., Ltd., Tokyo (JP)

(72) Inventors: Yoshihiro Terao, Tokyo (JP); Kazuto Kurosawa, Tokyo (JP)

(73) Assignee: JAPAN PETROLEUM EXPLORATION CO., LTD., Tokyo (JP)

( * ) Notice: Subject to any disclaimer, the term of this patent is extended or adjusted under 35 U.S.C. 154(b) by 0 days.

(21) Appl. No.: 17/914,818

(22) PCT Filed: Feb. 15, 2022

(86) PCT No.: PCT/JP2022/005930
§ 371 (c)(1),
(2) Date: Sep. 27, 2022

(87) PCT Pub. No.: WO2022/176847
PCT Pub. Date: Aug. 25, 2022

(65) Prior Publication Data
US 2023/0134985 A1    May 4, 2023

(30) Foreign Application Priority Data
Feb. 16, 2021    (JP) .................. 2021-022419

(51) Int. Cl.
*E21B 43/16*    (2006.01)
(52) U.S. Cl.
CPC .................. *E21B 43/164* (2013.01)
(58) Field of Classification Search
CPC ... Y02C 20/40; E21B 41/0064; E21B 43/164; E21B 43/168; E21B 43/166
See application file for complete search history.

(56) References Cited

U.S. PATENT DOCUMENTS

2009/0202304 A1* 8/2009 Koide ................ B01D 53/1475
405/129.2

FOREIGN PATENT DOCUMENTS

| JP | 2008-006367 A | 1/2008 |
| JP | 2008-019644 A | 1/2008 |

(Continued)

OTHER PUBLICATIONS

Translation of JP-2011031154-A. (Year: 2011).*
Int'l Search Report dated May 10, 2022 in Int'l Application No. PCT/JP2022/005930.

*Primary Examiner* — Zakiya W Bates
(74) *Attorney, Agent, or Firm* — Panitch Schwarze Belisario & Nadel LLP

(57) ABSTRACT

A method of underground storage of an injection gas containing CO2 gas and enhanced oil recovery includes: supplying injection water through a water flow path; jetting the injection water as a high-pressure water jet which is increased in velocity by narrowing a fluid flow through a fine bubble-generating device placed at a lower end of the water flow path; suctioning an injection gas through a gas flow path by a negative pressure generated by the Venturi effect downstream of the high-pressure water jet; jetting the injection gas as fine bubbles from the fine bubble-generating device placed at a lower end of the gas flow path; and performing underground storage of the injection gas by allowing a gas-liquid mixed fluid containing fine bubbles generated by mixing the injection water with the fine bubbles in the fine bubble-generating device to penetrate into a permeable formation such as an oil reservoir.

3 Claims, 3 Drawing Sheets

(56) References Cited

FOREIGN PATENT DOCUMENTS

| JP | 5315346 | B2 | 10/2013 |
| JP | 5399436 | B2 | 1/2014 |
| JP | 2017-218729 | A | 12/2017 |
| JP | 2021-014740 | A | 2/2021 |

* cited by examiner

METHOD OF UNDERGROUND STORAGE OF INJECTION GAS CONTAINING CO2 GAS AND ENHANCED OIL RECOVERY

CROSS-REFERENCE TO RELATED APPLICATIONS

This application is a Section 371 of International Application No. PCT/JP2022/005930, filed Feb. 15, 2022, which was published in the Japanese language on Aug. 25, 2022 under International Publication No. WO 2022/176847 A1, which claims priority under 35 U.S.C. § 119 to Japanese Patent Application No. 2021-022419, filed on Feb. 16, 2021, the disclosures of all of which are incorporated herein by reference in their entireties.

TECHNICAL FIELD

The present invention relates to underground storage of injection gas containing CO2 gas and enhanced recovery of oil contained in a permeable formation such as an oil reservoir using a fine bubble-generating device utilizing the Venturi effect.

BACKGROUND ART

In recent years, due to the use of large amounts of fossil fuels due to the increase in energy demand accompanying rapid economic growth, the concentration of carbon dioxide (hereinafter, abbreviated as CO2 gas in this specification) in the atmosphere has increased to a critical level.

In addition, at the Conference of the Parties to the United Nations Framework Convention on Climate Change (collectively called COP) held in Paris in 2015, the "Paris Agreement", which is an international framework for climate change issues after 2020, was agreed and entered into effect on November 2016. The key items of the Paris Agreement include "holding the increase in the global average temperature to well below 2.0° C. above pre-industrial levels and pursuing efforts to limit the temperature increase to 1.5° C. above pre-industrial levels", "to undertake rapid reductions thereafter in accordance with the best available science, so as to achieve a balance between anthropogenic emissions by sources and removals by sinks of greenhouse gases in the second half of the century".

As a result, as one of the measures against global warming, the immediate introduction of a global carbon dioxide capture and storage technology (hereinafter, abbreviated as CCS in this specification), and carbon dioxide capture, utilization, and storage technology (hereinafter, abbreviated as CCUS in this specification) is required.

CCS is used to collect CO2 gas emitted from power plants and chemical factories separately from other gases, and inject and store the CO2 gas into a stable formation deep underground. CCS is a technology that can significantly suppress CO2 gas emissions, and is expected to contribute to measures against global warming along with energy saving, renewable energy. On the other hand, the worldwide spread of CCS has not progressed as expected. There are several reasons for this, such as technological uncertainty, concerns about storage safety, and laws and regulations that have not been improved. In particular, due to an increase in CO2 gas separation and recovery costs, which account for majority of the costs, business feasibility may be difficult to predict.

Therefore, CCUS, which aims to produce value-added products by directly or indirectly using CO2 gas instead of simply storing the recovered CO2 gas, and to compensate for the cost of recovery, has attracted attention. For this reason, a technology for injecting gas containing CO2 gas into an oil reservoir using an enhanced oil recovery technology (hereinafter, abbreviated as FOR in this specification), which is one of the CCUS technologies, is a technically reliable method. Such technology can store CO2 gas underground as a measure against global warming, and can also improve the economic effect while increasing the oil recovery rate of oil, so that the utilization of FOR technology is indispensable.

There are primary to tertiary recovery methods for recovering oil from oil reservoirs. The primary recovery method is oil production by flowing oil production and artificial lift, and the secondary recovery method is to increase the amount of oil produced by injecting water or produced gas into an oil reservoir to recover the oil reservoir pressure. It is said that the primary and secondary recovery methods can increase the oil recovery rate from 30% to 40%. The tertiary recovery method is also called EOR, and is a recovery method applied after the application of the secondary recovery method, and known methods include a chemical injection method, a thermal injection method, a gas injection method including CO2 gas, and a microbial enhanced oil recovery method. These methods allow improvement in the oil recovery rate by increasing the fluidity of oil or decreasing the surface tension between water and oil through injection of chemicals, steam, and hot water into an oil reservoir, or creating a mixed state (miscible state) in a supercritical region between an injection gas containing CO2 gas and oil. It is said that the recovery rate can be increased up to about 50% to 60% by applying these recovery methods.

As a method of storing a large amount of CO2 gas underground, there is a method of injecting CO2 gas into an underground aquifer. Japanese Patent No. 5315346 proposes a storage method in which CO2 gas stored in a CO2 gas tank is boosted by a pumping device and injected from an injection well drilled vertically to the formation, CO2 gas is formed into microbubbles by a porous filter provided at the lower end of the injection well, and the microbubbles are dispersed into the formation water to store CO2 gas underground. Japanese Patent No. 5399436 proposes a storage apparatus and a storage method in which CO2 gas is injected by a pumping device from an injection well drilled horizontally to the formation, CO2 gas is formed into microbubbles by a porous filter provided at the lower end of the injection well, and the microbubbles are dispersed into the formation water to store CO2 gas underground.

In the technique described in Japanese Unexamined Patent Application, First Publication No. 2008-6367, the formation water in the aquifer is once pumped up, CO2 gas separated and recovered from exhaust gas of a plant facility is formed into microbubbles by an injector method in which CO2 gas is released into water as bubbles in the well, and is then mixed with injection water to enter a gas-liquid, mixed state, and the mixture is injected into the aquifer again. This method requires a water well for pumping formation water and a pump for pumping up water from water well, which causes an increase in the scale of the entire system, and there is a problem in that the power for storage also increases. Furthermore, the injection pressure into the aquifer needs to be balanced with the pumping pressure at the pumping well, and the pumping amount and the injection amount need to be matched, so that there is a problem in that CO2 gas cannot be stored efficiently.

Japanese Unexamined Patent Application, First Publication No. 2008-01.9644 proposes an enhanced recovery method and an enhanced recovery system for oil, or natural gas in which an injection gas is rotated at a high speed in a tubing pipe and a microbubble-generating device that have been moved downward in a well while being injected from the surface, injection water is injected between a casing pipe and the tubing pipe from the surface to allow the injection gas to generate microbubbles and be mixed in the injection water so as to create a gas-liquid mixed fluid in the well, and this is injected into an oil layer or a gas layer from an injection well to penetrate into fine gaps in the layer, whereby enhanced recovery of oil or gas is achieved by the microbubbles in the injection water.

CITATION LIST

Patent Documents

Patent Document 1: Japanese Patent No. 5315346
Patent Document 2: Japanese Patent No. 5399436
Patent Document 3: Japanese Unexamined Patent Application, First Publication No. 2008-6367
Patent Document 4: Japanese Unexamined Patent Application, First Publication No. 2008-019644

SUMMARY OF INVENTION

Technical Problem

An object of the present invention is to provide a system for underground storage of an injection gas containing $CO_2$ gas and enhanced oil recovery, by efficiently generating fine bubbles from an injection gas using a fine bubble-generating device utilizing the Venturi effect, mixing the fine bubbles with injection water to generate a gas-liquid mixed fluid containing the fine bubbles, and allowing the gas-liquid mixed fluid to penetrate into gaps of a permeable formation such as an oil reservoir, through an injection well.

Solution to Problem

In the present invention, a method of underground storage of an injection gas containing $CO_2$ gas and enhanced oil recovery includes: a step of boosting injection water by a high-pressure pump so as to be injected into a fine bubble-generating device; a step of increasing the velocity of the boosted injection water by narrowing the flow of a fluid through a high-pressure nozzle so as to be jetted as high-pressure water jet, thereby suctioning an injection gas into the fine bubble-generating device by a negative pressure generated by the Venturi effect downstream of the high-pressure nozzle; a step of generating a gas-liquid mixed fluid containing fine bubbles by mixing the suctioned injection gas formed into fine bubbles by the shear force of the high-pressure water jet, with the injection water, while reducing the velocity of this at a throat part in the fine bubble-generating device, converting the velocity energy into a pressure energy, and finally boosting the gas-liquid mixed fluid containing fine bubbles to the same pressure; and a step of allowing the boosted gas-liquid mixed fluid containing fine bubbles to penetrate into the permeable formation such as an oil reservoir, by moving the gas-liquid mixed fluid in a wellhead and the inside of a well.

The present invention may have a configuration in which, in a case where the fine bubble-generating device is placed in an injection pipe forming two flow paths using two pipes, a water flow path is a water injection pipe, and a gas flow path is a gas injection pipe.

In addition, the present invention may have a configuration in which the two flow paths have a double pipe structure of an outer pipe and an inner pipe, the water flow path is provided between the inner side of the outer pipe and the outer side of the inner pipe, the gas flow path is provided on the inner side of the inner pipe, and the fine bubble-generating device is placed at the lower end of the inner pipe.

In addition, the present invention may have a configuration in which the two flow paths also have a double pipe structure of an outer pipe and an inner pipe, the gas flow path is provided between the inner side of the outer pipe and the outer side of the inner pipe, the water flow path is provided on the inner side of the inner pipe, and the fine bubble-generating device is placed at the lower end of the outer pipe.

The injection gas means a hydrocarbon gas, an oil field flare gas, nitrogen gas, $CO_2$ gas, a combustion exhaust gas, and a gas in which these are mixed. Therefore, in a case where $CO_2$ gas, an oil field flare gas, a combustion exhaust gas, or a gas in which these are mixed is used as the injection gas, the injection gas containing $CO_2$ gas can be stored underground in the permeable formation such as an oil reservoir, which is effective in measures against global warming.

While river water or seawater is used as the injection water, formation water produced from a production well may be reused by being mixed with the injection water such as river water or seawater. In either case, the injection water containing water other than that derived from the formation is injected. Therefore, the injection water is treated with chemicals or the like added before the injection so as not to cause the obstruction of fine gaps due to the swelling of the formation or the like by the injection water.

The fine bubbles mean bubbles having a diameter of 100 μm or less, and include microbubbles (bubbles having a diameter of 1 μm to 100 μm) and nanobubbles (bubbles having a diameter of several ten to several hundred nanometers).

In addition, oil, natural gas, and formation water recovered from fine gaps by the fine bubbles in the oil reservoir are produced as a production fluid from the production well together with the injection water and the injection gas that have been injected from the injection well and moved to the production well through the oil reservoir. This production fluid is separated into oil, natural gas and injection gas, and formation water and injection water by a three-phase separator that separates production fluids with different specific gravities on the surface. The oil is transferred to a crude oil tank and sold, the natural gas and the injection gas are transferred to an injection gas tank and reused as an injection gas, and the formation water and the injection water further separated are also transferred to an injection water tank and reused as injection water.

Advantageous Effects of Invention

By adopting the mechanism of the present invention, the high-pressure injection water is injected into the high-pressure nozzle in the fine bubble-generating device from one high-pressure pump, and is increased in velocity by narrowing the flow of the fluid by the high-pressure nozzle to be jetted as the high-pressure water jet, thereby generating a negative pressure by the Venturi effect downstream of the high-pressure nozzle. As a result, the injection gas is suctioned into the fine bubble-generating device, forms fine bubbles by the shear force of the high-pressure water jet, and is mixed with the injection water, whereby the gas-liquid mixed fluid containing fine bubbles can be generated.

In addition, by allowing the gas-liquid mixed fluid containing fine bubbles to be injected and penetrate into the gaps of the permeable formation such as the oil reservoir, oil, natural gas, and formation water can be recovered from the fine gaps in the permeable formation such as the oil reservoir, which is effective in enhancing the recovery of oil and natural gas from the production well drilled at a point other than the injection well. In addition, the gas-liquid mixed fluid containing fine bubbles generates a downward flow due to the density difference from the formation water and the formation inclination, and the density of the fine bubbles is increased by the additional pressure in the bubbles (Laplace pressure) due to their extremely small particle sizes and the formation pressure, so that the gas-liquid mixed fluid has an extremely small relative upward flow velocity (Stokes velocity) with respect to the formation water. Therefore, the injection gas containing CO2 gas can be stored underground.

In addition, due to the negative pressure generated by the Venturi effect downstream of the high-pressure nozzle, the injection gas is naturally suctioned into the fine bubble-generating device, so that there is no need to use a complicated pumping and storage system such as a gas pump or a gas tank for supplying the injection gas, and an effect of reducing the facility cost is expected.

Next, the production fluid is produced from the production well, and is separated into oil, natural gas and injection gas, and formation water and injection water by a three-phase separator that separates production fluids with different specific gravities on the surface. Oil is transferred to a crude oil tank and sold. The natural gas and the injection gas, which have a gas phase, are transferred to an injection gas tank and reused as an injection gas. In addition, the separated formation water and the injection water are also transferred to an injection water tank and reused as injection water.

DESCRIPTION OF EMBODIMENTS

Hereinafter, embodiments for carrying out the present invention will be specifically described with reference to the drawings. An object of the present invention is to achieve enhanced oil recovery by recovering oil and natural gas present at fine gaps of a permeable formation such as an oil reservoir, by using a gas-liquid mixed fluid containing fine bubbles, and to store an injection gas containing CO2 gas underground.

First Embodiment

Figure 1:
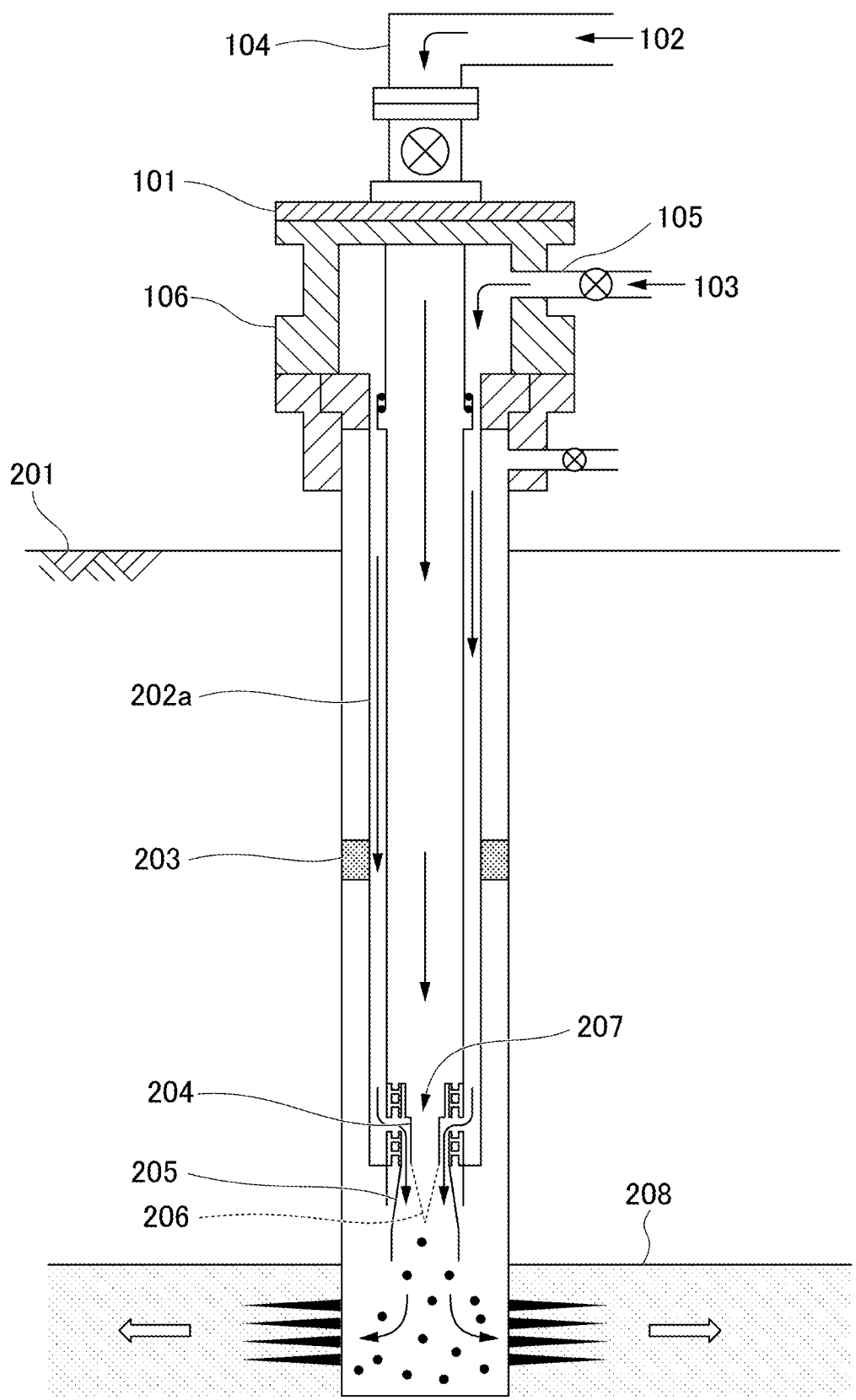
FIG. 1 is a diagram showing a method of underground storage of injection gas containing CO2 gas and enhanced oil recovery, in which a fine bubble-generating device is placed in an injection pipe forming two flow paths using two pipes.

A method of underground storage of injection gas 103 containing CO2 gas and enhanced oil recovery includes: in an injection well 101 in which an injection pipe 202a forming two flow paths using two pipes shown in FIG. 1 is placed, a step of boosting injection water 102 by a high-pressure pump so as to be injected through a water injection pipe 104; a step of jetting a high-pressure water jet 206 which is increased in velocity by narrowing the flow of a fluid through a high-pressure nozzle 204 of a fine bubble-generating device 207 placed at the lower end of the water injection pipe 104, and suctioning the injection gas 103 through a gas injection pipe 105 by a negative pressure generated by the Venturi effect downstream of the high-pressure nozzle 204; a step of generating a gas-liquid mixed fluid containing fine bubbles by allowing the suctioned injection gas 103 to form fine bubbles by the shear force of the high-pressure water jet 206 and be mixed with the injection water 102; and a step of allowing the gas-liquid mixed fluid containing the fine bubbles to directly penetrate into a permeable formation 208 such as an oil reservoir.

Second Embodiment

Figure 2:
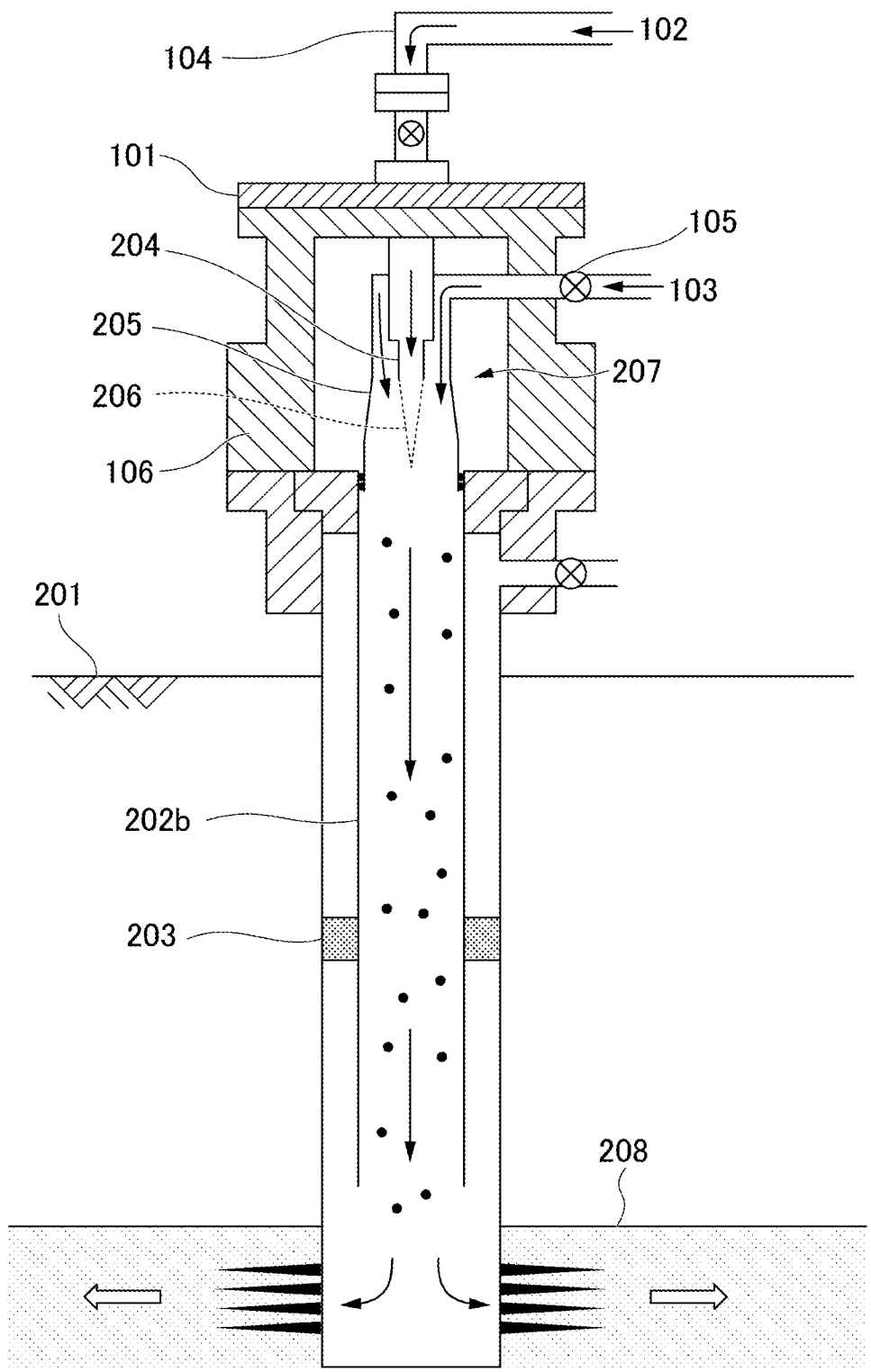
FIG. 2 is a diagram showing a method of underground storage of injection gas containing CO2 gas and enhanced oil recovery, in which a fine bubble-generating device is placed in a wellhead.

A method of underground storage of injection gas 103 containing CO2 gas and enhanced oil recovery includes: in a state where a fine bubble-generating device 207 shown in FIG. 2 is placed in a wellhead 106, a step of, as in the first embodiment, boosting injection water 102 by a high-pressure pump so as to inject the injection water 102 through a water injection pipe 104; a step of jetting a high-pressure water jet 206 which is increased in velocity by narrowing the flow of a fluid through a high-pressure nozzle 204 of the fine bubble-generating device 207 placed in the wellhead 106, and suctioning the injection gas 103 through a gas injection pipe 105 by a negative pressure generated by the Venturi effect downstream of the high-pressure nozzle 204; a step of generating a gas-liquid mixed fluid containing fine bubbles by allowing the suctioned injection gas 103 to form fine bubbles by the shear force of the high-pressure water jet 206 and be mixed with the injection water 102; and a step of allowing the gas-liquid mixed fluid to penetrate into a permeable formation 208 such as an oil reservoir, through an injection pipe 202b.

Third Embodiment

Figure 3:
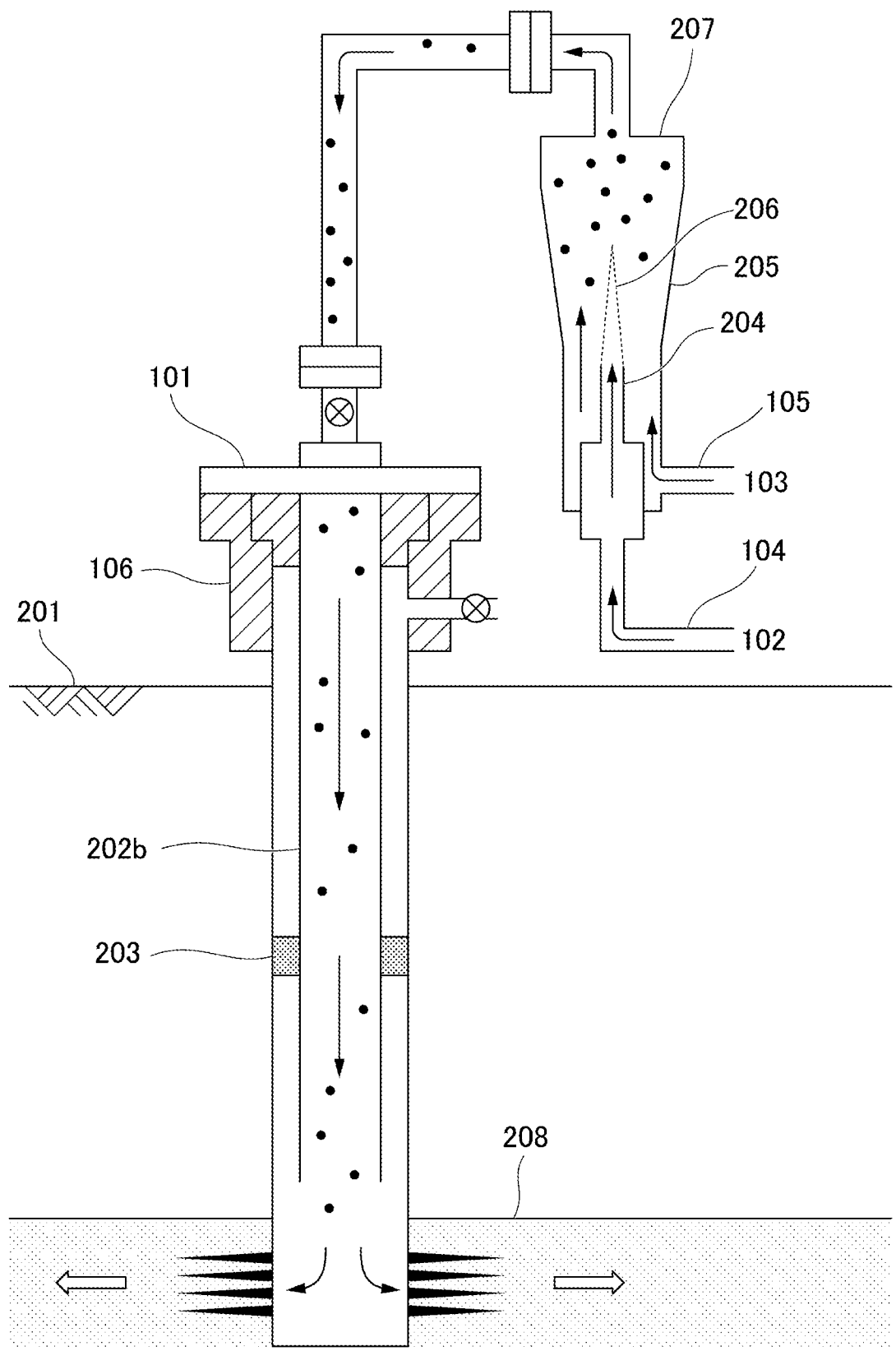
FIG. 3 is a diagram showing a method of underground storage of injection gas containing CO2 gas and enhanced oil recovery, in which a fine bubble-generating device is placed on the surface.

A method of underground storage of injection gas 103 containing CO2 gas and enhanced oil recovery includes: in a state where a fine bubble-generating device 207 shown in FIG. 3 is placed on a surface, a step of, as in the first embodiment, boosting injection water 102 by a high-pressure pump so as to inject the injection water 102 through a water injection pipe 104; a step of jetting a high-pressure water jet 206 which is increased in velocity by narrowing the flow of a fluid through a high-pressure nozzle 204 of the fine bubble-generating device 207 placed on the surface, and suctioning the injection gas 103 through a gas injection pipe 105 by a negative pressure generated by the Venturi effect downstream of the high-pressure nozzle 204; a step of generating a gas-liquid mixed fluid containing fine bubbles by allowing the suctioned injection gas 103 to form fine bubbles by the shear force of the high-pressure water jet 206 and be mixed with the injection water 102; and a step of allowing the gas-liquid mixed fluid to penetrate into a permeable formation 208 such as an oil reservoir, through a wellhead 106 and an injection pipe 202b.

The fine bubble-generating device 207 is composed of the gas injection pipe 105, the water injection pipe 104, the high-pressure nozzle 204, and a throat 205 forming an outer cylinder, and a hard metal is used. Cases where the fine bubble-generating device 207 is placed in the inner pipe of two pipes or a double pipe in the well, is placed in the wellhead 106, and is placed on the surface are considered. In any case, the fine bubble-generating device 207 has a hollow coaxial cylindrical shape. Since the particle size of the fine bubbles depends on the degree of the shear force of the high-pressure water jet 206, a risk of plugging the high-pressure nozzle 204 and the throat 205 with floating solid in the injection water 102 is greatly reduced compared to a porous filter formed of ceramic material. In addition, since the injection gas 103 is suctioned into the fine bubble-generating device 207 by the negative pressure generated by the Venturi effect downstream of the high-pressure jet 206, the pumping device for increasing the flow rate of the injection gas 103 does not need to be large. Furthermore, increasing the inside diameter of the high-pressure nozzle 204 reduces the pressure loss of the fluid, and it is easy to accelerate the amount of the injection gas 103, but requires attention to maintaining the bubble diameter of the fine bubbles.

REFERENCE SIGNS LIST

101: Injection well
102: Injection water
103: Injection gas
104: Water injection pipe
105: Gas injection pipe
106: Wellhead
201: Surface
202a: Injection pipe forming two flow paths using two pipes
202b: Injection pipe
203: Packer
204: High-pressure nozzle
205: Throat
206: High-pressure water jet
207: Fine bubble-generating device
208: Permeable formation

The invention claimed is:

1. A method of underground storage of injection gas containing CO2 gas and enhanced oil recovery, which is performed through an injection well including two flow paths as a water flow path and a gas flow path and a fine bubble-generating device placed at lower ends of the water and gas flow paths, the method comprising:
    a step of supplying an injection water through the water flow path to the injection well;
    a step of jetting a high-pressure water jet which is increased in velocity by narrowing a flow of the injection water through the fine bubble-generating device with suctioning an injection gas through the gas flow path into the fine bubble-generating device, fine bubbles of the injection gas being jetted with the injection water from the fine bubble-generating device; and
    a step of allowing a gas-liquid mixed fluid containing fine bubbles generated by mixing the injection water with the fine bubbles in the fine bubble-generating device to penetrate into a permeable formation such as an oil reservoir,
wherein the two flow paths have a double pipe structure of an outer pipe and an inner pipe,
    the gas flow path is provided between an inner side of the outer pipe and an outer side of the inner pipe,
    the water flow path is provided on an inner side of the inner pipe,
    the fine bubble-generating device is placed at a lower end of the outer pipe, and
    the fine bubble-generating device is composed of the gas flow path, the water flow path, a high-pressure nozzle which increases the velocity by narrowing the flow of the injection water, and a throat forming an outer cylinder.

2. The method of underground storage of injection gas containing CO2 gas and enhanced oil recovery according to claim 1, wherein the fine bubble-generating device is placed in a wellhead.

3. The method of underground storage of injection gas containing CO2 gas and enhanced oil recovery according to claim 1, wherein the fine bubble-generating device is placed on a surface.

* * * * *